US010677633B2

(12) United States Patent
Bacon

(10) Patent No.: US 10,677,633 B2
(45) Date of Patent: Jun. 9, 2020

(54) SYSTEM FOR APPROXIMATING THE CONTENTS OF A DISPENSING CONTAINER

(71) Applicant: TRIG1 LIMITED, Waterlooville, Hampshire (GB)

(72) Inventor: Raymond John Bacon, Waterlooville (GB)

(73) Assignee: TRIG1 Limited, Hampshire (GB)

(*) Notice: Subject to any disclaimer, the term of this patent is extended or adjusted under 35 U.S.C. 154(b) by 421 days.

(21) Appl. No.: 15/565,942

(22) PCT Filed: Apr. 27, 2016

(86) PCT No.: PCT/GB2016/051182
§ 371 (c)(1),
(2) Date: Oct. 12, 2017

(87) PCT Pub. No.: WO2016/174421
PCT Pub. Date: Nov. 3, 2016

(65) Prior Publication Data
US 2018/0113018 A1    Apr. 26, 2018

(30) Foreign Application Priority Data

Apr. 29, 2015    (GB) .................................. 1507339.8

(51) Int. Cl.
*G01F 23/00*    (2006.01)
*B65D 25/56*    (2006.01)
(Continued)

(52) U.S. Cl.
CPC .......... *G01F 23/0038* (2013.01); *B65D 25/56* (2013.01); *B65D 83/38* (2013.01); *G01F 23/02* (2013.01)

(58) Field of Classification Search
CPC ...... G01F 23/0038; G01F 23/02; G01F 22/00; B65D 25/56; B65D 83/38;
(Continued)

(56) References Cited

U.S. PATENT DOCUMENTS 407,515 A    7/1889 Duffield
3,505,870 A    4/1970 Smylie
(Continued)

FOREIGN PATENT DOCUMENTS

DE    19605006 C1    8/1997
EP    1227423 A1    7/2002
(Continued)

OTHER PUBLICATIONS

PCT Search Report and Written Opinion for PCT Application No. PCT/GB2016/051182, dated Jun. 30, 2016, 10 pages.
(Continued)

*Primary Examiner* — Xin Y Zhong
(74) *Attorney, Agent, or Firm* — Maine Cernota & Rardin

(57) ABSTRACT

The present invention provides a system for approximating the contents of a dispensing container, the system comprising: a dispensing container comprising a vessel, the vessel having: a formation and/or a discreet element in or on the vessel which causes the centre of gravity of liquid contents of the vessel to be positioned differently, when oriented in a lain-on side attitude, from its notional position, in the absence of the formation and/or discreet element, and an indicator configured to indicate a change of the liquid contents of the vessel; a gauge, separate to the dispensing container, configured to be co-operable with the indicator of the dispensing container, the gauge comprising an interface between the gauge and the dispensing container and a scale
(Continued)

which, in co-operation with the indicator of the dispensing container, signifies to a user the approximate liquid contents of the vessel.

22 Claims, 9 Drawing Sheets

(51) Int. Cl.
    *B65D 83/38*    (2006.01)
    *G01F 23/02*    (2006.01)

(58) Field of Classification Search
    CPC .... B65D 2203/045; G06T 7/97; G01B 3/563; G06F 19/321; G06K 19/06037; A61M 2205/3389; A61M 15/0068; A61M 15/009
    See application file for complete search history.

(56) References Cited

U.S. PATENT DOCUMENTS

| | | |
|---|---|---|
| 5,579,759 A | 12/1996 | Gantz |
| 9,114,926 B2 * | 8/2015 | Bacon .................. G01F 22/00 |
| 2003/0116629 A1 | 6/2003 | Sauve |
| 2010/0006599 A1 | 1/2010 | Cebulski |
| 2013/0087609 A1 | 4/2013 | Nichol et al. |
| 2013/0301901 A1 | 11/2013 | Satish |
| 2014/0152847 A1 | 6/2014 | Zomet et al. |
| 2017/0305646 A1 * | 10/2017 | Bacon .................. B65D 83/38 |

FOREIGN PATENT DOCUMENTS

| | | |
|---|---|---|
| GB | 2348676 A | 10/2000 |
| GB | 2529873 A | 3/2016 |
| JP | 2012056618 A | 3/2012 |
| WO | 2011095761 A1 | 8/2011 |

OTHER PUBLICATIONS

Great Britain Further Search Report for GB Application No. GB1507339.8, dated Jan. 22, 2016, 3 pages.
Great Britain Further Search Report for GB Application No. GB1507339.8, dated Nov. 19, 2015, 2 pages.
Great Britain Search Report for GB Application No. GB1507339.8, dated Oct. 16, 2015, 7 pages.

* cited by examiner

SYSTEM FOR APPROXIMATING THE CONTENTS OF A DISPENSING CONTAINER

RELATED APPLICATIONS

This application is a national phase application filed under 35 USC § 371 of PCT Application No. PCT/GB2016/051182 with an International filing date of Apr. 27, 2016, which claims priority of GB Patent Application 1507339.8 filed Apr. 29, 2015. Each of these applications is herein incorporated by reference in its entirety for all purposes.

FIELD

The present invention relates to a system for approximating the contents of a dispensing container particularly, but not exclusively, a dispensing container for storing and dispensing medicine.

BACKGROUND

Dispensing containers come in many shapes and sizes. A particular problem associated with pressurized liquid dispensing containers, but not limited thereto, is the difficulty of determining the level of liquid present within the container. Such containers typically comprise a valve for dispensing liquid from the container and a vessel containing the liquid under pressure. The vessel is typically manufactured from impact extruded aluminium or rolled and welded sheet steel. Such materials are opaque making it impossible to see the quantity of liquid in the container. The quantity of liquid in the container also cannot easily be determined by handling, feel or sound of the container.

This problem is particularly evident in the medical field and particular in relation to inhalers used for respiratory conditions such as asthma. It is critical that a person suffering from a respiratory condition has access to inhalers to relieve symptoms such as being short of breath. Not being able to assess the volume of a medicinal product in an inhaler container is problematic as the user of an inhaler would not be able to identify when they need to order a new inhaler or assess whether the inhaler has dispensed the number of doses that it contains. Thus it is not uncommon for person's suffering from respiratory conditions to either run out of their inhaler before they order a new one or order a new one and dispose of the old inhaler before it is empty thus wasting the contents. A common inhaler used for relieving symptoms of asthma is labelled as containing 200 doses although such a container may contain enough medicine for approximately 240 doses. The inhaler is not provided with a dose counter hence an average user would be unaware when the inhaler is empty, or nearly so. Once around 200 doses have been metered, the inhaler will still dispense medicine but it will not dispense medicine at the recommended or specified dosage. Such a combination of medicine and propellant may not be sufficient to relieve symptoms of asthma leading to continuing, and potentially worsening, respiratory symptoms or may not be an effective treatment dose.

There are several methods of approximating the contents of inhalers which are not provided with dose counters. The most common are: shaking the can and listening to the contents moving, weighing the can by hand, observing the quality or strength of the spray and general observations on effectiveness. None of these methods can provide an accurate approximation of the contents of an inhaler.

WO2011/095761 provides solutions to the problem of not being able to determine the quantity of liquid in a pressurized liquid dispensing container.

The present invention seeks to provide a system for determining the quantity of liquid present in a dispensing container, particularly a dispensing container for dispensing medicine.

SUMMARY

An aspect of the present invention provides a system for approximating the contents of a dispensing container, the system comprising a dispensing container comprising a vessel, the vessel having: a formation and/or a discreet element in or on the vessel which causes the centre of gravity of liquid contents of the vessel to be positioned differently, when oriented in a lain-on-side attitude, from its notional position, in the absence of the formation and/or discreet element, and an indicator configured to indicate a change of the liquid contents of the vessel; and, a gauge, separate to the dispensing container, configured to be co-operable with the indicator of the dispensing container, the gauge comprising an interface between the gauge and the dispensing container and a visual scale which, in co-operation with the indicator of the dispensing container, signifies to a user the approximate liquid contents of the vessel.

Another aspect of the present invention provides a device for determining the contents of a dispensing container, the device comprising: an input for receiving information relating to the position of a dispensing container relative to a surface; a memory for storing information received by the input and pre-stored information; a processing unit for comparing information received by the input with the pre-stored information and determining the level of liquid content of the dispensing container based on the position of said dispensing container relative to a surface; and an output for indicating the liquid contents of the dispensing container to a user.

Another aspect of the present invention provides a method of determining the contents of a dispensing container, the method comprising: a) positioning a dispensing container, comprising a vessel having a valve, wherein, the vessel is circularly cylindrical and formed with a groove within its circular cylindrical envelope, extending parallel with the length of the vessel giving it an inflected cylindrical sidewall, in a lain-on-side orientation; and b) comparing the notional position of the dispensing container with a gauge to indicate the level of liquid content of the dispensing container.

Another aspect of the present invention provides a dispensing container comprising a vessel, the vessel having: a formation and/or a discreet element in or on the vessel which causes the centre of gravity of liquid contents of the vessel to be positioned differently, when oriented in a lain-on-side attitude, from its notional position, in the absence of the formation and/or discreet element, and an indicator configured to indicate a change of the liquid contents of the vessel.

Another aspect of the present invention provides a gauge for approximating the level of liquid content of a dispensing container, the gauge comprising: an interface for interfacing with a dispensing container, and a scale, wherein when the dispensing container is a lain-on-side attitude, rotation of the dispensing container relative to the interface of the gauge changes the position of the marker relative to the scale of the gauge to indicate to a user an approximation of the level of liquid content of the dispensing container.

Another aspect of the invention provides a system for approximating the contents of a dispensing container, the system comprising: a dispensing container comprising a vessel, the vessel having: a formation and/or a discreet element in or on the vessel which causes the centre of gravity of liquid contents of the vessel to be positioned differently, when oriented in a lain-on-side attitude, from its notional position, in the absence of the formation and/or discreet element, and a gauge comprising a scale; an indicator, separate to the dispensing container, configured to be co-operable with the gauge of the dispensing container, the indicator comprising an interface between the indicator and the dispensing container which, in co-operation with the gauge of the dispensing container, signifies to a user the approximate liquid contents of the vessel.

The aforementioned aspects of the invention provide solutions to the problem of being unable, or finding it difficult, to approximate the remaining liquid contents of a dispensing container, particularly a dispensing container holding medicine. By being able to ascertain an approximate liquid content of a dispensing container a user is able to order a replacement before the content of the dispensing container is depleted. The user is also able to better utilize the liquid content of the dispensing container without discarding the dispensing container while it still contains usable content.

The gauge may be defined by a reference card.

The interface may be an aperture through the reference card.

The indicator may comprise a marker configured to change position in accordance with the change of liquid contents of the vessel.

The visual scale of the gauge may comprise a first colored segment and a second colored segment, different to the first, wherein alignment of the indicator with the first colored segment signifies to a user that the dispensing container contains contents and alignment of the indicator with the second colored segment signifies to the user that the dispensing container is empty of contents, or nearly so.

The aperture through the reference card may be located centrally in at least one dimension or located proximate to an edge of the reference card.

The indicator may comprise an arrow provided on a proximal or distal end of the dispensing container.

The reference card may have at least one substantially straight edge.

The aperture through the reference card may be positioned proximate a substantially straight edge.

The first colored segment may be arranged substantially parallel to a substantially straight edge of the reference card and the second colored segment may be arranged about the aperture through the reference card.

Both the first colored segment and the second colored segments may be arranged substantially parallel to a substantially straight edge of the reference card.

Both the first colored segment and the second colored segment may be arranged about the aperture through the reference card.

The visual scale may further comprise a third colored segment.

The third colored segment may be arranged substantially parallel to a substantially straight edge of the reference card.

The third colored segment may be arranged about the aperture through the reference card.

The gauge may be defined by a display on a visual display unit.

The interface may be defined by a surface of the visual display unit.

The system may further comprise a memory for storing a plurality of images depicting a dispensing container having varying levels of liquid content.

The system may further comprise an image capture device for capturing an image of the dispensing container, a processing unit for comparing a captured image to a stored image, and output means for displaying an output on the visual display unit to indicate to a user whether the dispensing container contains content or is empty, or nearly so.

The surface of the visual display unit may be configured to permit the dispensing container to roll across the surface of the visual display unit, wherein the distance the dispensing container rolls across the surface of the visual display unit is measured to determine the level of contents of the dispensing container.

The dispensing container may comprise a vessel having a valve crimped on at a neck in the vessel, wherein, the vessel is circularly cylindrical and formed with a groove within its circular cylindrical envelope, extending parallel with the length of the vessel giving it an inflected cylindrical sidewall.

Further aspects of the invention relate to methods of determining characteristics of dispensing containers.

Such an aspect of the invention provides a method of interpreting a characteristic of a dispensing container, the method comprising: i) taking an image of a portion of the dispensing container on a portable device; ii) sending the image to a remote processing device; iii) extracting a pre-determined segment of data from the image; iv) comparing said segment of data to a reference data set; v) determining a result based on step iv); vi) sending said result to the portable device; and vii) displaying said result on the portable device.

Another aspect of the invention provides a method of interpreting a characteristic of a dispensing container, the method comprising: i) taking an image of a portion of the dispensing container on a portable device: ii) sending the image to a remote processing device; iii) receiving an identifying characteristic from the remote processing device; and iv) displaying the identifying characteristic on the portable device.

Another aspect of the invention provides a method of interpreting a characteristic of a dispensing container, the method comprising: i) receiving an image from a portable device; ii) extracting a pre-determined segment of data from the image; iii) comparing said segment of data to a reference data set; iv) determining a result based on step iii); and iv) sending the result to the portable device.

Another aspect of the invention provides a method of interpreting a characteristic of a dispensing container, the method comprising: i) taking an image of a portion of the dispensing container on a portable device; ii) extracting a pre-determined segment of data from the image; iii) comparing said segment of data to a reference data set; iv) determining a result based on step iii); and v) displaying the result on the portable device.

Another aspect of the invention provides a method of interpreting a characteristic of a dispensing container, the method comprising: i) taking an image of a portion of the dispensing container on a portable device; ii) displaying the image on the portable device; iii) displaying one or more reference images on the portable device adjacent to the image; iv) requesting a user to select a reference image closest to the image; and v) displaying a result on the portable device.

Another aspect of the invention provides a method of interpreting a characteristic of a dispensing container, the method comprising: i) taking an image of a portion of the dispensing container on a portable device; ii) sending the image to a remote processing device; iii) extracting a pre-determined segment of data from the image; iv) comparing said segment of data to a reference data set; v) determining a result based on step iv); and vi) sending said result to a data storage device.

The aforementioned methods enable data relating to dispensing containers to be used by users, manufacturers, medical professionals, for example, to be used for identifying characteristics relating to particular dispensing containers and therefore users. This can be advantageous for a number of reasons including: i) users can order new dispensing containers before they run out of content and can avoid discarding dispensing containers which still contain usable content thus saving money; ii) manufacturers can identify user habits to enable customization or optimization of dispensing container design in order to improve user experience, content use, for example; iii) medical professionals can use data to identify inhaler usage patterns, respiratory symptom frequency, aggravating factors, for example.

BRIEF DESCRIPTION OF THE DRAWINGS

Certain embodiments will now be described with reference to the following drawings:

FIG. 4a shows a side view of a first container in accordance with the invention;

FIG. 4b shows a detail view of part of the first container of FIG. 4a;

FIG. 5a shows a side view of a second container in accordance with the invention;

FIG. 5b shows a detail view of part of the second container of FIG. 5a;

FIG. 6a shows a side view of a third container in accordance with the invention;

FIG. 6b shows a detail view of part of the third container of 6a

DETAILED DESCRIPTION OF THE CERTAIN EMBODIMENTS

The certain embodiments will now be described, by way of example only, with reference to the brief description of the drawings.

Figure 3:
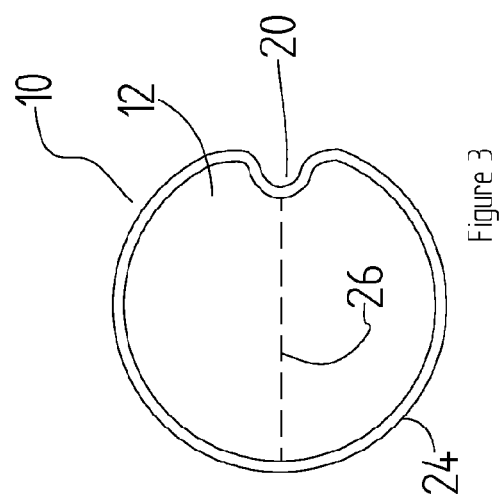
FIG. 3 shows a side view of the container of FIGS. 1 and 2 with the groove effectively floating on the surface of the liquid therein.
Figure 2:
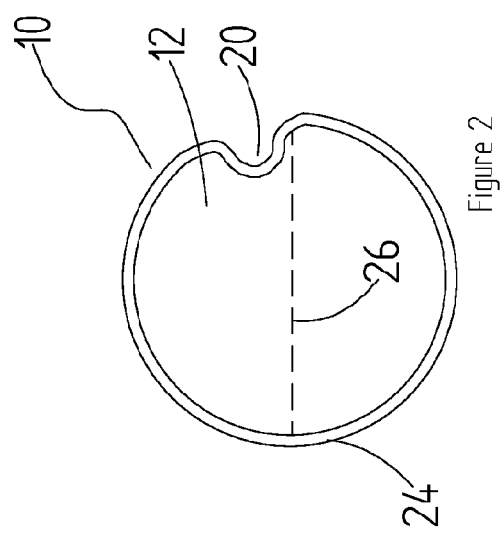
FIG. 2 shows a side view of the container of FIG. 1 with the groove positioned above the level of liquid therein.
Figure 1:
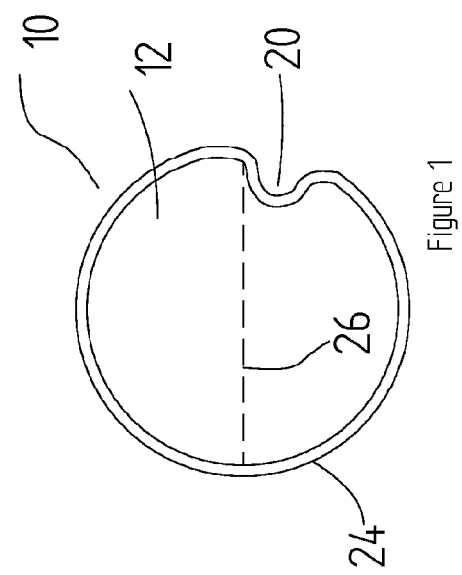
FIG. 1 shows a side view of a container with an external groove positioned beneath the level of liquid therein.

Referring to the figures, the dispenser 10 thereshown comprises a vessel 12 with a valve 14 crimped on at a neck 16 in the vessel. The valve has a dispensing stem 18. The vessel is circularly cylindrical and formed with a groove 20 within its circular cylindrical envelope, extending parallel with the length of the vessel giving it an inflected cylindrical sidewall. The arrangement is such that when the container is in an attitude of being lain on its sidewall 24, in which the groove 20 is, if the groove 20 is initially beneath the surface of the liquid 26 in the container, as shown in FIG. 1, the container 10 will roll, changing its orientation, until the groove 20 is at the surface of the liquid 26, as shown in FIG. 3, with the groove 20 in effect floating on the surface of the liquid 26. If the groove 20 is initially above the liquid 26, as shown in FIG. 2, since it biases the centre of gravity of the vessel 12 and the container 10 towards itself, being of constant wall thickness or having a bias weight in or on the vessel, the container 10 will roll again until the groove 20 is floating on the surface of the liquid 26, as shown in FIG. 3. Thus the extent of fullness of the container 10 can be determined by where the groove 20 comes to rest.

As shown in the figures, the groove 20 may extend only partially along the length of the vessel 12. The groove 20 may be oriented centrally in the longitudinal dimension of the vessel 12 or offset. In other embodiments the groove 20 may extend along the entire longitudinal dimension of the vessel from a base 22 to the neck 16.

When the liquid level is low, the groove 20 extending from end to end of the vessel 12 provides a particularly accurate indication of content, since liquid 26 cannot flow behind it.

Figures 4A, 4B:
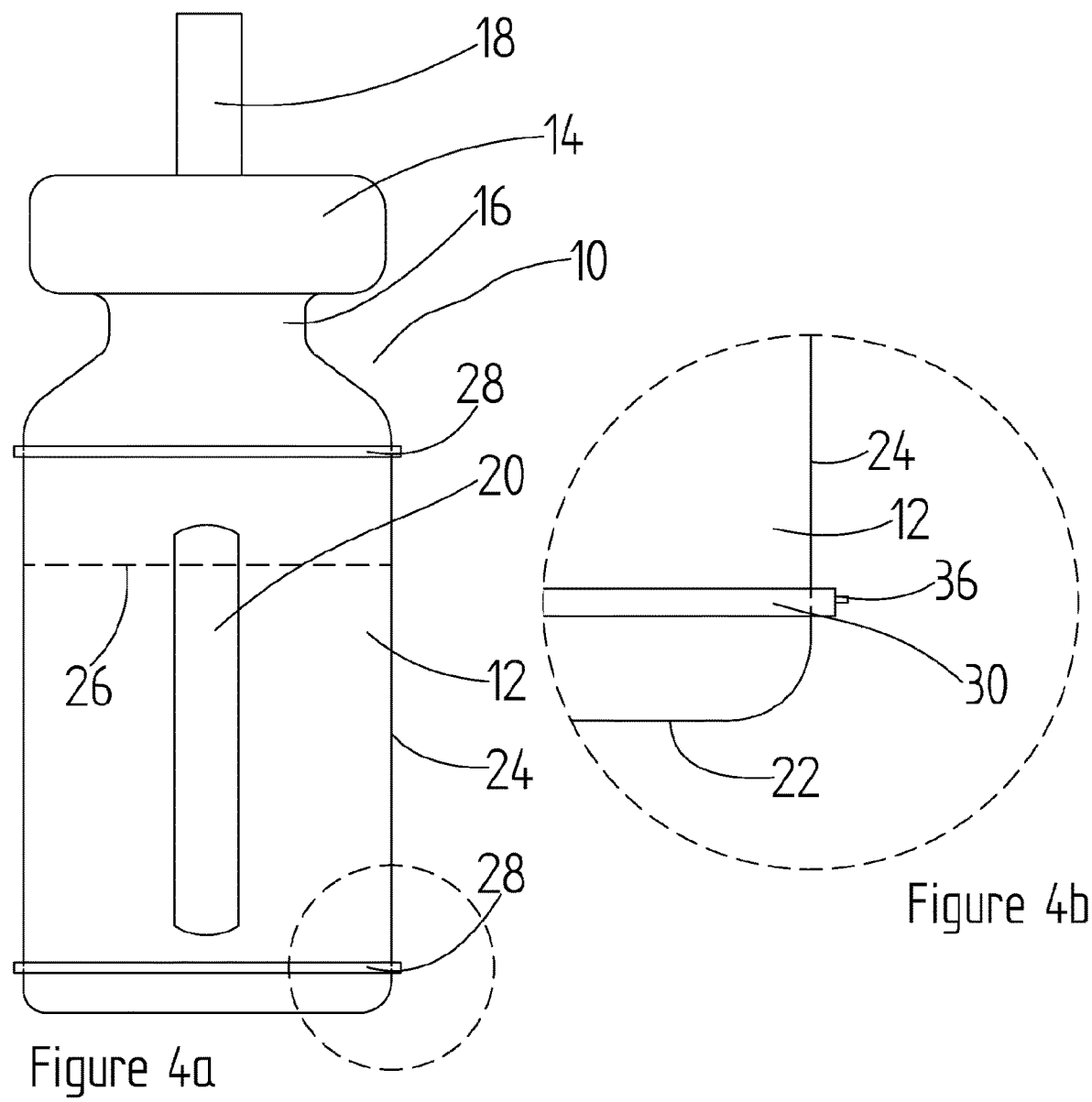

To assist the container 10 in being able to roll, a substantially circumferential formation 28 is provided at least at one end of the vessel 12 to lift the sidewall 24 of the vessel 12 away from a surface. FIGS. 4a and 4b show a roll-stable pressurized liquid dispenser 10 which has a tyre 30, or band, positioned around the vessel 12 at each end thereof. The tyre 30, or band, has a width of approximately 1 mm and a depth of approximately 1 mm. The tyre 30, or band, lifts the sidewall 24 of the vessel away from a surface by a distance of approximately 1 mm. The tyre 30, or band, can be made from rubber, silicone, plastic, metal, or any other suitable material. The tyre 30, or band, has a smooth surface so as to reduce friction between the tyre 30, or band, and a surface. The formation 28 may extend around the entire circumference of the vessel 12 or only partially around the circumference of the vessel 12.

The tyre 30, or band, can be adhered to the vessel 12 or can utilize the elastic properties of the tyre 30, or band, to hold the tyre 30, or band, in the desired position. In some embodiments of the invention, the tyre 30, or band, can be positioned within a circumferential groove 32 in the sidewall 24 of the vessel 12, as shown in FIGS. 5a and 5b.

In certain embodiments the formation 28 may be part of a label which is embossed or printed, for example to provide a raised area.

Figures 6A, 6B:
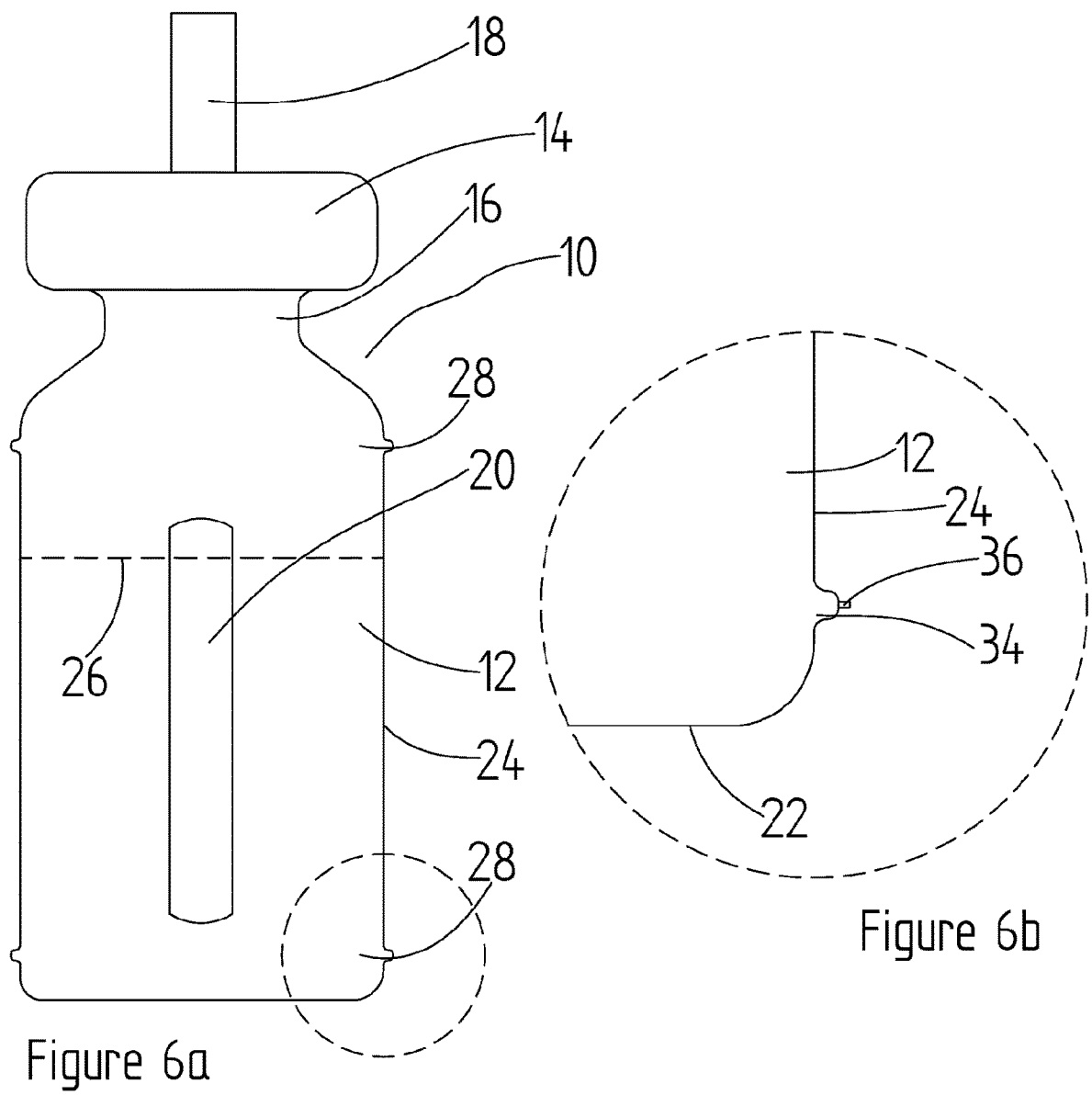

FIGS. 6a and 6b show a dispenser 10 which has an integral circumferential protuberance 34 formed in the sidewall 24 of the vessel 12. The protuberance defines a substantially uniformly curved surface which protrudes approximately 1 mm from the sidewall 24 of the vessel 12.

Figures 5A, 5B:
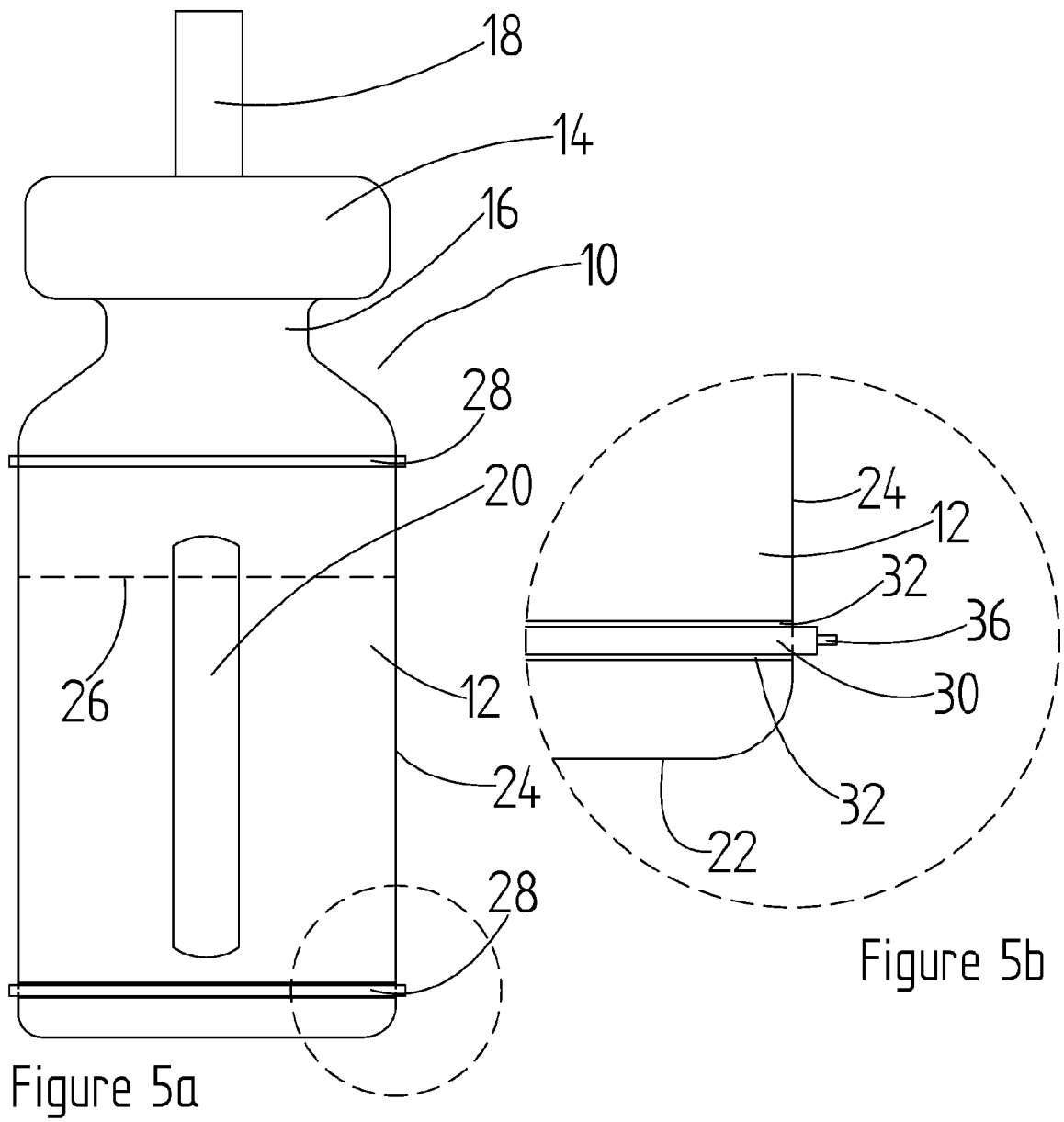

As shown in FIGS. 4b, 5b and 6b, the formation 28 is provided with a projection 36 which projects outwardly from the formation 28 to introduce an element of instability to the container. The projection 36 prevents the container 10 from settling at a dead centre orientation. In one embodiment the projection is a pin which has a length of between 1 mm and 10 mm and a width of between 0.5 mm and 3 mm. The pin is made from the same material as the circumferential protuberance, tyre or 3D printed label and is integral therewith. However, the skilled person will appreciate that in other embodiments the projection may be a separate component from the circumferential protuberance 34, tyre 30 or 3D printed label and maybe formed from a different material. The projection, in some embodiments, may also be a protuberance, spike or bump, for example.

To assist a user in determining the liquid content level of the container 10, a gauge 50 is used in conjunction with the container 10 to approximate the liquid content level therein. The gauge 50 is configured to be separate from the container 10 and comprises an interface 52 for interfacing with the container 10 and a visual scale 54a, 54b to indicate the approximate level of liquid content in the container 10 to the user.

Figure 7:
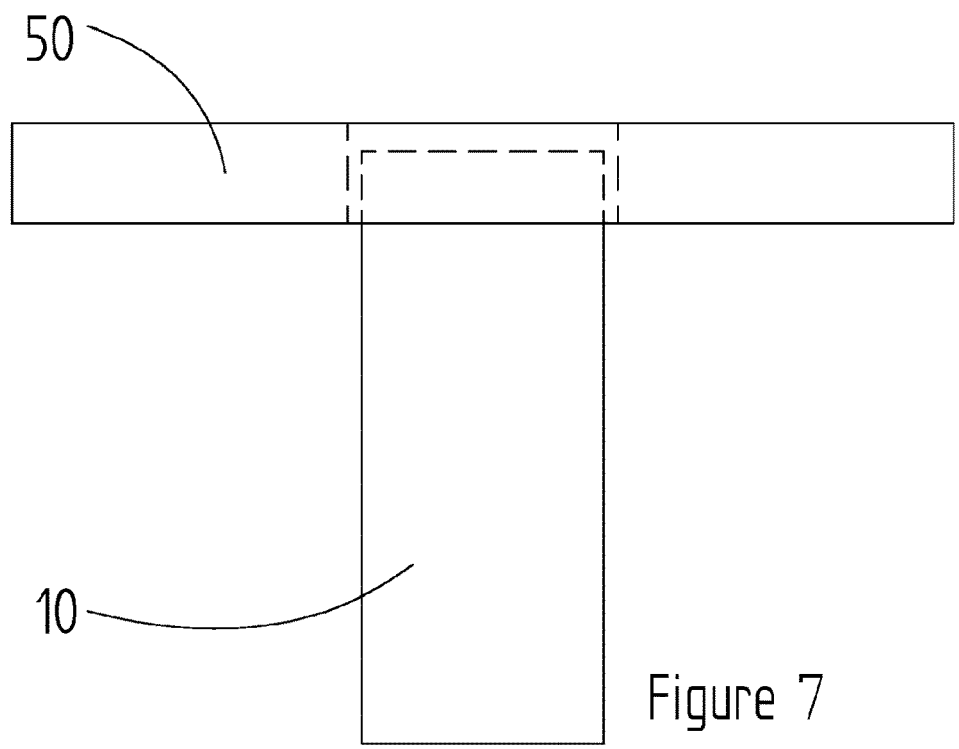
FIG. 7 shows a plan view of an indicator card of the present invention in use with a dispensing container in an arbitrary position.
Figure 8:
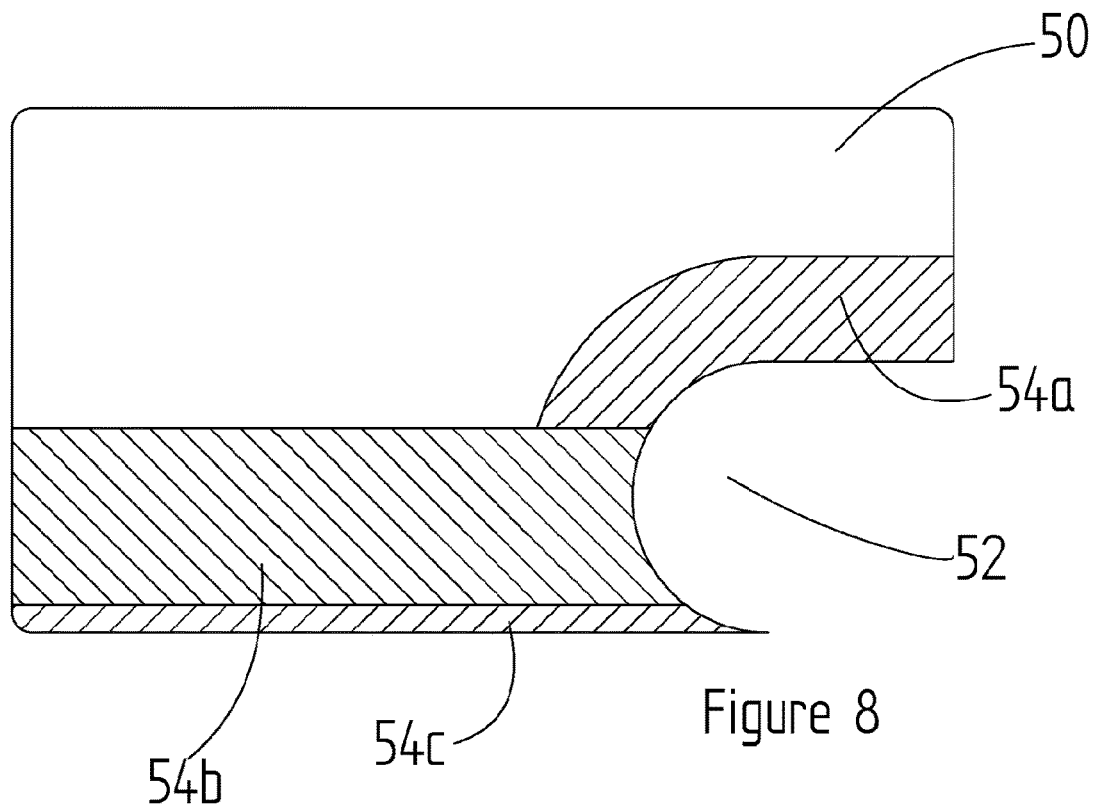
FIG. 8 shows a side view of a first embodiment of indicator card (card 1)
Figure 9:
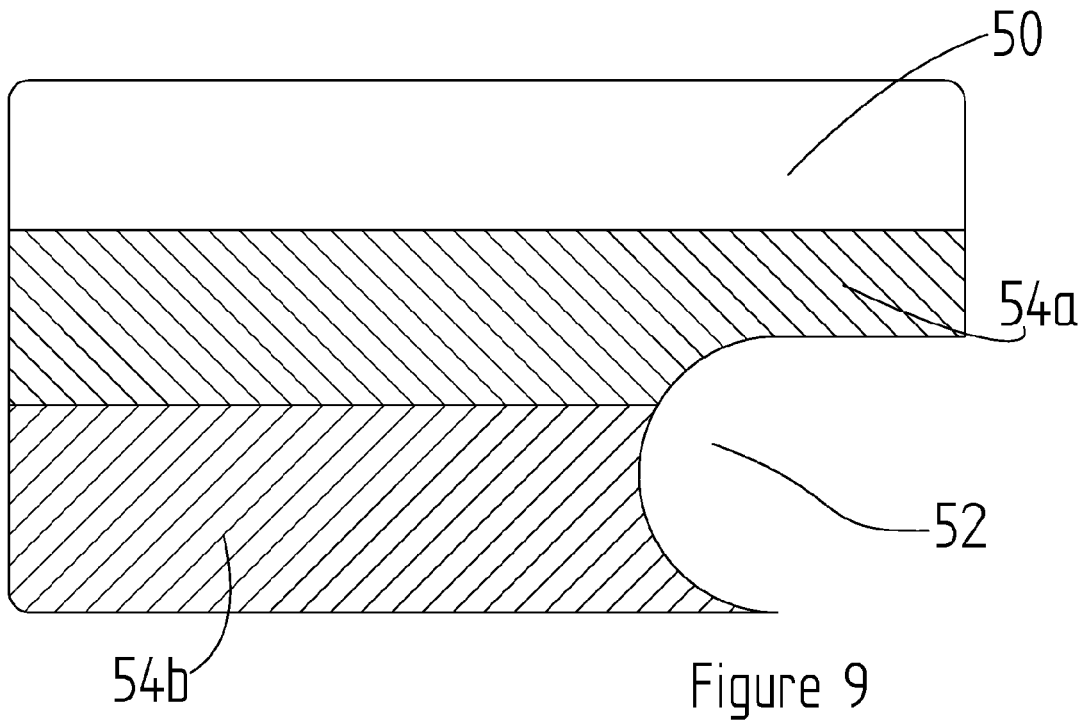
FIG. 9 shows a side view of a second embodiment of indicator card (card 2)
Figure 10:
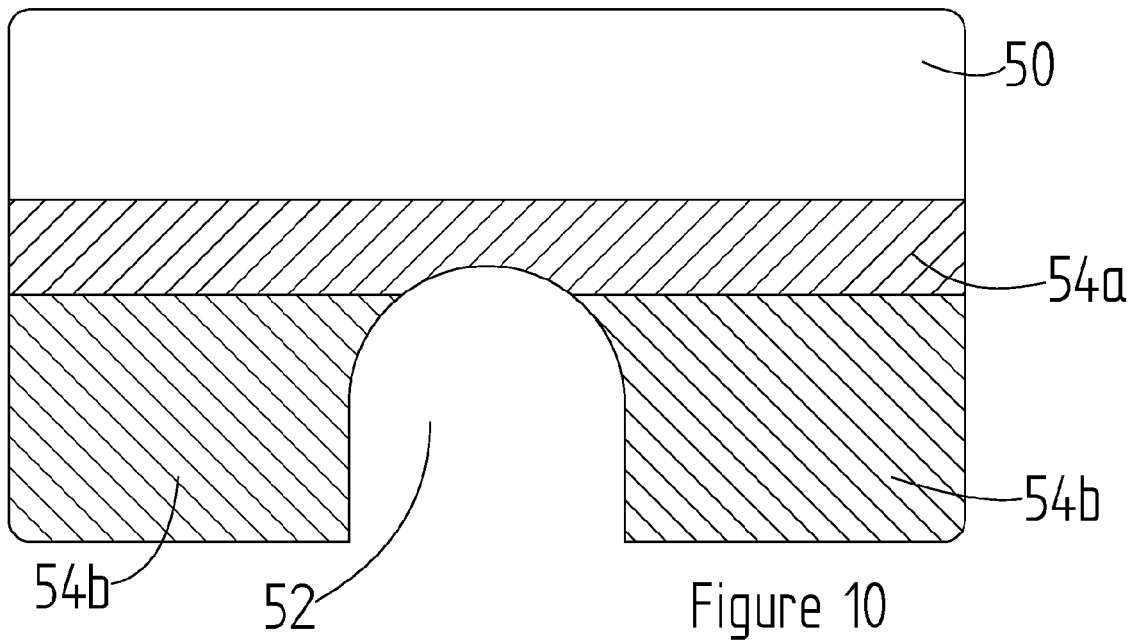
FIG. 10 shows a side view of a third embodiment of indicator card (card 3)
Figure 11:
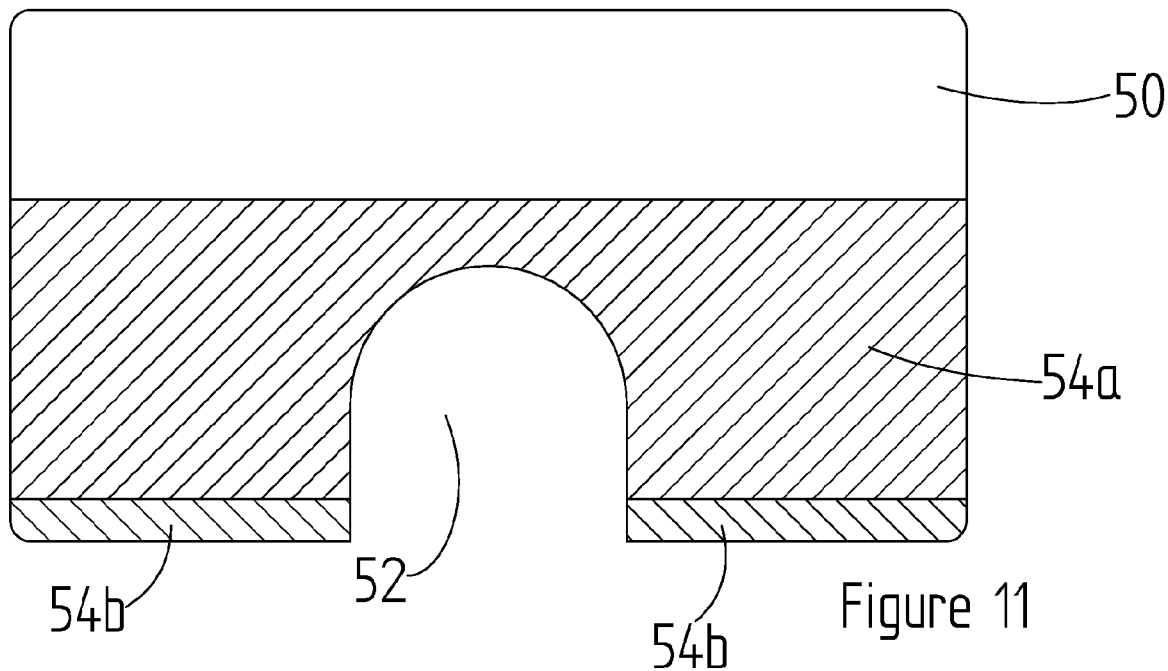
FIG. 11 shows a side view of a fourth embodiment of indicator card (card 4)
Figure 12:
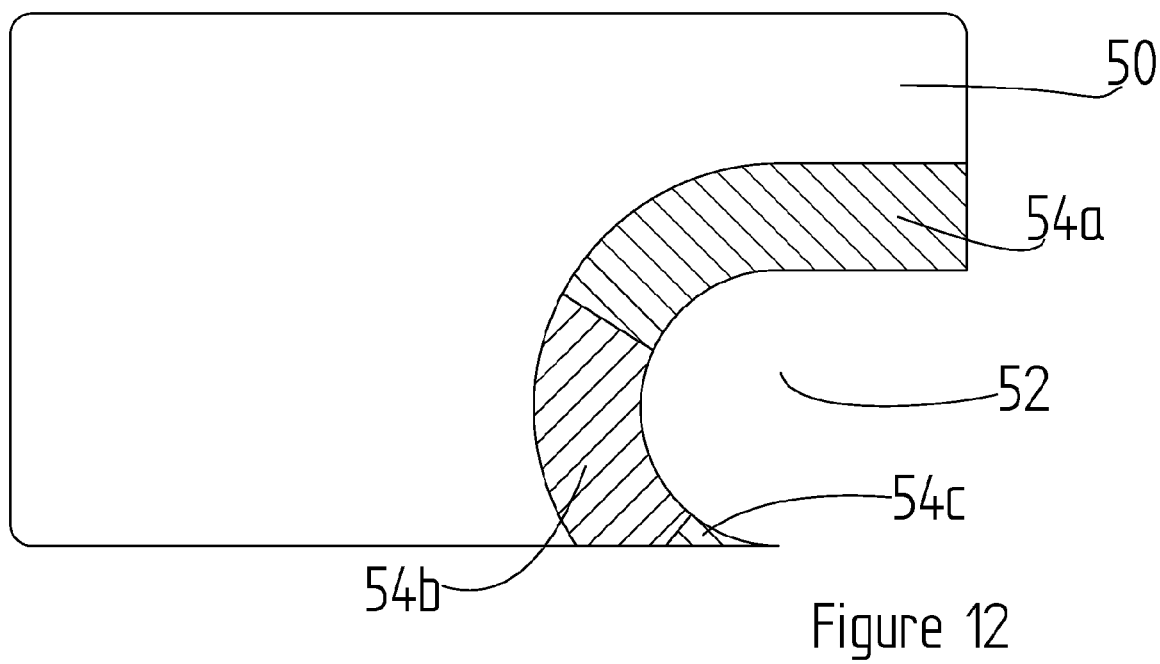
FIG. 12 shows a side view of a fifth embodiment of indicator card (card 5)
Figure 13:
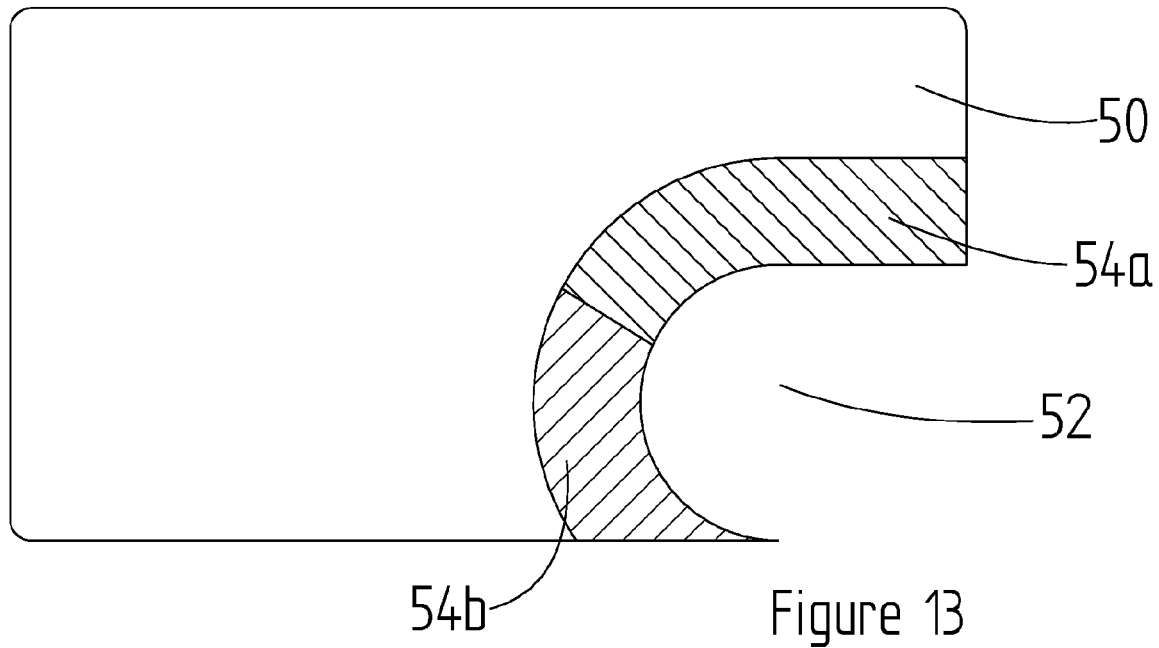
FIG. 13 shows a side view of a sixth embodiment of indicator card (card 6)
Figure 14:
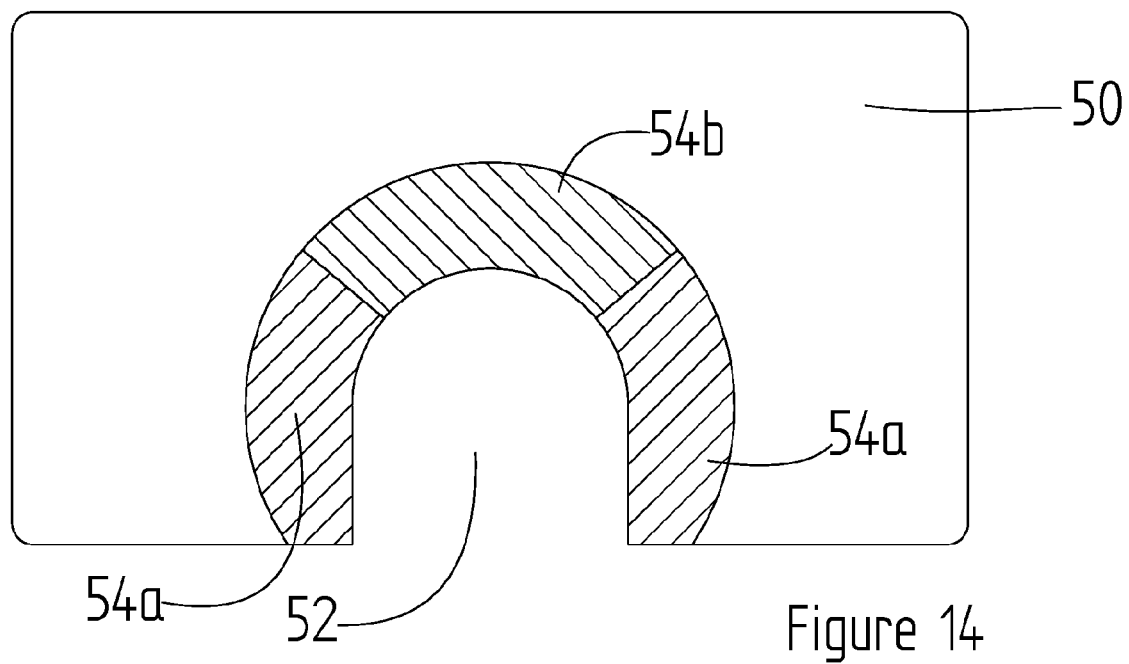
FIG. 14 shows a side view of a seventh embodiment of indicator card (card 7)
Figure 15:
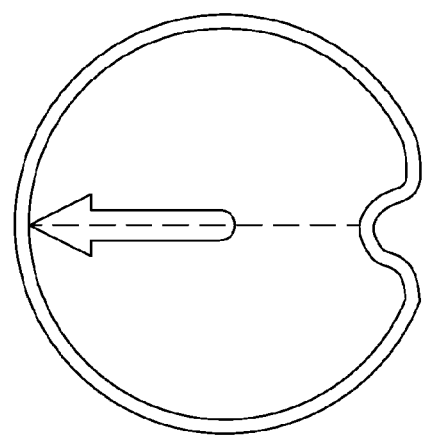
FIG. 15 shows a view on the end of a dispensing container according to embodiments of the invention.
Figure 16:
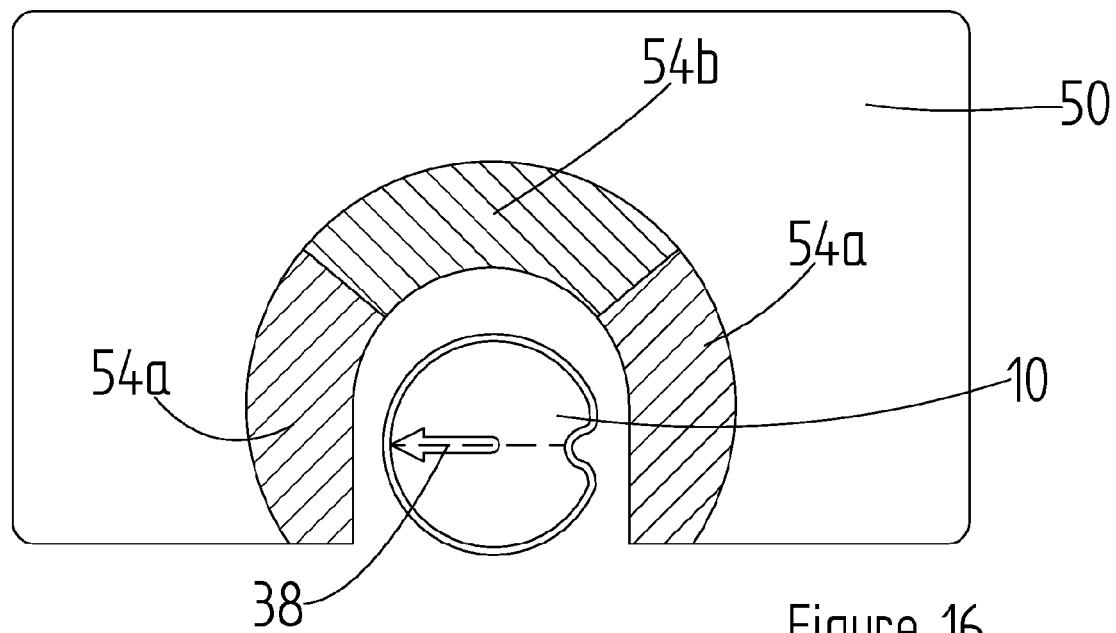
FIG. 16 shows a view on the end of the dispensing container of FIG. 15 in combination with the indicator card of FIG. 14.

In one embodiment of the invention, the gauge 50 is a reference card which comprises an aperture 52 configured to, in use, be positioned about the container 10 (as seen in FIG. 7) and a plurality of colored segments 54a, 54b to correspond with a range of liquid content levels of the container 10. The reference card 50 can be positioned in any position along the length of the container 10 or adjacent to the container 10. The container 10 is provided with a marker 38 (see FIG. 15) which rotates with the container 10 as the container 10 rolls on a surface. The marker 38 in the illustrated embodiments is in the form of an arrow which, in use, points towards a colored segment 54a, 54b on the visual scale of the gauge 50 to approximate the level of liquid content in the container 10 (see FIG. 16). Depending on the configuration of the dispensing container 10, the arrow 38 will signify that the dispensing container 10 is empty, or nearly so, if it is pointing up or down. If the arrow 38 is pointing sideways, this signifies that the dispensing container 10 contains at least some liquid content.

FIGS. 8 to 14 show various embodiments of reference cards that may be used in the present invention. Each of the reference cards shown comprises an aperture 52 through the reference card and a plurality of colored segments 54a, 54b, 54c arranged such that at least a portion of each colored segment 54a, 54b, 54c is positioned about the aperture 52.

Each reference card was tested in conjunction with dispensing containers 10, particularly inhalers, having random fill levels of: full, half full, borderline empty and empty in order to test the accuracy of approximating the level of liquid content in each inhaler tested. Two types of inhaler were tested: i) one having a can up configuration and ii) the other having a can down configuration.

By can up configuration it is meant that the marker 38 points generally upwardly when the contents of the dispensing container are depleted. By can down configuration is meant that the marker 38 points generally downwardly when the contents of the dispensing container 10 are depleted.

The purpose of the testing was to identify unsafe failures, where a test subject considered that an empty inhaler was ok to use, and safe failures where a test subject considered that an inhaler still having liquid contents needed to be replaced. The following table summarizes the test results observed.

| Can Orientation | Card | Safe failure rates | | | | Average by Card |
|---|---|---|---|---|---|---|
| | | Full | Half full | Borderline | Empty | |
| Can Down cans | 1 | 5% | 37% | 0% | 0% | 11% |
| | 3 | 0% | 26% | 0% | 0% | 7% |
| | 5 | 0% | 21% | 0% | 0% | 5% |
| Average 'can down' cans | | 2% | 28% | 0% | 0% | 7% |
| Can up cans | 2 | 0% | 21% | 0% | 0% | 5% |
| | 4 | 5% | 26% | 0% | 0% | 8% |
| | 6 | 0% | 11% | 0% | 0% | 0% |
| | 7 | 0% | 0% | 0% | 0% | 0% |
| Average 'can up' cans | | 1% | 14% | 0% | 0% | 4% |

No unsafe failure rates were observed in relation to any of the reference cards shown in FIGS. 7 to 14.

Although the embodiments shown in FIGS. 7 to 14 show a reference card with an aperture therethrough, it will be appreciated that the reference card could comprise a transparent window through which the end of a container 10 can be viewed. Alternatively the reference cards can each be solid with no aperture or window. In such an embodiment a user would compare a circumferential marker or scale on the container 10 with a scale or marker on the reference card to determine liquid content of the container.

In use, the dispensing container 10 is able to roll left or right on a surface depending on its orientation when lain on the surface. The reference card is double sided with the scale mirrored on either side thereof. The colored segments 54a, 54b of the scale are colored such that green indicates that the dispensing container is safe to use, orange indicates that the dispensing container is safe to use but its contents are low and red indicates that the dispensing container is empty and not safe to use. Alternatively the colored segments could be provided in green and red only to indicate only if the dispensing container is safe to use or not.

In card 7 (see FIG. 14), where no failures, safe or unsafe, were recorded, the colored segments 54a, 54b of the scale are arranged about the aperture 52 in a clock-face type arrangement. Two segments 54b are colored green and indicate that the dispensing container 10 used therewith is safe to use and one segment 54a is colored red indicating that the dispensing container 10 used therewith is empty, or nearly so, and unsafe to use.

As be can seen in FIGS. 8 to 14, multiple arrangements of colored segments 54a, 54b are possible. It is however important that at least a portion of each colored segment 54a, 54b is arranged about the aperture.

In a further embodiment of the invention, the gauge 50 is provided as part of a device or embedded in software installed on a device. In particular, the gauge 50 is part of a software program or application installed on a smart phone, tablet, or other portable electronic device.

In its simplest form, the invention can be put into effect through a series of images displayed on a visual display unit. A user can compare the images with the orientation of a dispensing container 10 to determine the level of liquid content in the dispensing container 10. Alternatively, an image of a dispensing container 10 can be superimposed on the visual display unit. Using a camera application on a device, a user would align the superimposed image with an image of the actual dispensing container 10 on a visual display unit. The superimposed image would comprise a scale 54a, 54b, similar to the reference card described above, such that the user can determine an approximation of the level of liquid content of the dispensing container by observing where on the scale a marker 38, such as an arrow, on the dispensing container 10 points towards.

To increase accuracy of approximation of the level of liquid content in a dispensing container 10, the device can be used to perform certain calculations in order to arrive at an accurate figure. This can be done in a number of different ways. For example, the dispensing container 10 could be lain-on its side on a visual display unit. The dispensing container would roll a certain distance depending on the level of liquid content therein. A measuring function within the device would be used to determine the distance that the dispensing container 10 had rolled across the visual display unit. From the distance rolled, the device would be able to calculate the approximate percentage level of liquid content of the dispensing container 10.

Alternatively, an image of the orientation of the dispensing container 10 after it has rolled on a surface could be captured by the device. The orientation of the dispensing container would be compared by the device with a plurality of pre-stored images of dispensing containers 10 in a range of orientations depending on the level of liquid content. The device would select a pre-stored image which is closest to the image captured by the device of the orientation of the dispensing container 10 to approximate its contents. A message would be displayed on the visual display unit to indicate to the user the approximate level of liquid content of the dispensing container and to indicate if the dispensing container is safe to use.

Modern devices such as mobile phones, tablet personal computers, smart glasses, smart watches and laptops, for example, are provided with means for communicating data over the internet, via mobile communications networks and directly between devices. A user of such a device is able to use a device to take an image of a dispensing container through the device's camera functionality. The image is captured by the device and stored in the memory of the device which could be integral or a removable storage card, for example.

The image, in one embodiment of the invention, is sent by the device to a remote processing device. The remote processing device is configured to extract a segment of data from the image such as a QR code, positioning indicator, marker, label, dispensing counter, for example. The segment of data is compared by the remote processing device to a reference data set selected from data entries held in an electronic database. A series of images from the reference data set are compared to the segment of data. For each comparison a true or false result is indicated. The segment of data is compared to consecutive images from the reference data set until a true result is indicated. The remote processing device then generates an output in a user friendly format indicating a characteristic of the dispensing container 10. The characteristic may be type, content type, content volume, for example. The remote processing device sends the output corresponding to the result to the device and the device displays the output graphically. The output can vary but examples are identification of the particular dispensing container 10 imaged, the contents type of the dispensing container 10 or the contents volume of the dispensing container 10.

The user is able to use the output to perform one or more further actions. If the output displayed on the device is an identification of the particular dispensing container 10, the user may wish to enter data into the device by way of a key pad, keyboard, mouse or other input device. Such data may correlate to environmental conditions, exercise, illness, for example, in the case of a dispensing container 10 used to contain asthma medication. Such data would be useful in generating a long term history of medication usage in response to various factors.

If the output displayed on the device is content type, the user can use that information to verify that they are using a dispensing container 10 with the desired content. This could be particularly useful when using dispensing containers storing natural gas or liquefied petroleum gas, for example, where the dispensing container 10 can become externally worn over time through use.

If the output displayed on the device is content volume, the user can ensure that they order a replacement dispensing container 10 before the content is depleted. This is particularly advantageous in relation to dispensing containers used for storing asthma medication as running out of medication could be fatal for a person suffering from an asthma attack.

In another embodiment of the invention, the device can be provided with an electronic database stored within its memory. An application, or programme, can be installed on the device and instructed to compare an image of the dispensing container with a reference data set selected from data entries held in the electronic database stored on the device. Like in the previously described example, an image taken by the camera function of the device, or at least a portion thereof, is compared with subsequent images selected from the reference data set. When a true result is generated by virtue of a match between a portion of the image and a data entry from the reference data set, the result is output on the screen of the device.

In another embodiment of the invention, a user is instructed to take an image of a dispensing container 10 using the device. The instruction is displayed on the screen of the device. The image is displayed on the screen of the device. The image, or a portion thereof, is compared to images held in an electronic database and an image resembling the image taken by the device is displayed on the screen of the device next to the image taken by the device. A user is requested to confirm that the images materially match. If the images match, the user can verify a characteristic of the device. If the images do not match, the user can indicate on the device that there is no match. Subsequent images may then be displayed on the screen of the device until the user indicates a match.

Alternatively, some embodiments may simply display subsequent images on the screen of the device without automatically comparing an image taken by the device with images in an electronic database, whether stored on the device or a remote processing device. In such an embodiment, a small pre-defined dataset is stored in an electronic database on the device. After the user has taken an image using the device, the image is displayed on the screen of the device. Images are then displayed on the device next to the image taken by the device until the user indicates a match and confirms a characteristic of the dispensing container 10. In some embodiments, the images will cycle automatically at pre-determined intervals without user intervention. In other embodiments the user will be requested to press either a tick or a cross on the screen of the device to signify match or no match respectively.

The invention claimed is:

1. A system for approximating the contents of a dispensing container, the system comprising:

a dispensing container comprising a vessel, the vessel having: a formation and/or a discreet element in or on the vessel that causes the vessel's center of gravity to be off-center when oriented in a lain-on-side attitude, and an indicator configured to indicate a change of the liquid contents of the vessel; and a gauge, separate to the dispensing container, configured to be co-operable with the indicator of the dispensing container, the gauge comprising an interface between the gauge and the dispensing container and a visual scale which, in co-operation with the indicator of the dispensing container, signifies to a user the approximate liquid contents of the vessel, wherein the interface between the gauge and the dispensing container comprises an opening configured to accommodate the dispensing container therethrough when the dispensing container is orientated in the lain-on-side attitude.

2. The system for approximating the contents of a dispensing container according to claim 1, wherein the gauge is defined by a reference card.

3. The system for approximating the contents of a dispensing container according to claim 2, wherein the interface is an aperture through the reference card.

4. The system for approximating the contents of a dispensing container according to claim 3, wherein the indicator comprises a marker configured to change position in accordance with the change of liquid contents of the vessel.

5. The system for approximating the contents of a dispensing container according to claim 4, wherein the visual scale of the gauge comprises a first colored segment and a second colored segment, different to the first, wherein alignment of the indicator with the first colored segment signifies to a user that the dispensing container contains contents and alignment of the indicator with the second colored segment signifies to the user that the dispensing container is empty of contents, or nearly so.

6. The system for approximating the contents of a dispensing container according to claim 3, wherein the aperture through the reference card is located centrally in at least one dimension.

7. The system for approximating the contents of a dispensing container according to claim 3, wherein the aperture through the reference card is located proximate to an edge of the reference card.

8. The system for approximating the contents of a dispensing container according to claim 4, wherein the indicator comprises an arrow provided on a proximal or distal end of the dispensing container.

9. The system for approximating the contents of a dispensing container according to claim 3, wherein the reference card has at least one substantially straight edge.

10. The system for approximating the contents of a dispensing container according to claim 9, wherein the aperture through the reference card is positioned proximate a substantially straight edge.

11. The system for approximating the contents of a dispensing container according to claim 5, wherein the first colored segment is arranged substantially parallel to a substantially straight edge of the reference card and the second colored segment is arranged about the aperture through the reference card.

12. The system for approximating the contents of a dispensing container according to claim 5, wherein both the first colored segment and the second colored segments are arranged substantially parallel to a substantially straight edge of the reference card.

13. The system for approximating the contents of a dispensing container according to claim 5, wherein both the first colored segment and the second colored segment are arranged about the aperture through the reference card.

14. The system for approximating the contents of a dispensing container according to claim 5, wherein the visual scale further comprises a third colored segment.

15. The system for approximating the contents of a dispensing container according to claim 14, wherein the third colored segment is arranged substantially parallel to a substantially straight edge of the reference card.

16. The system for approximating the contents of a dispensing container according to claim 14, wherein the third colored segment wraps around at least a portion of the aperture.

17. The system for approximating the contents of a dispensing container according to claim 1, wherein the gauge is defined by a display on a visual display unit.

18. The system for approximating the contents of a dispensing container according to claim 17, wherein the interface is defined by a surface of the visual display unit.

19. The system for approximating the contents of a dispensing container according to claim 17, further comprising a memory for storing a plurality of images depicting a dispensing container having varying levels of liquid content.

20. The system for approximating the contents of a dispensing container according to claim 19, further comprising an image capture device for capturing an image of the dispensing container, a processing unit for comparing a captured image to a stored image, and output means for displaying an output on the visual display unit to indicate to a user whether the dispensing container contains content or is empty, or nearly so.

21. The system for approximating the contents of a dispensing container according to claim 18, wherein the surface of the visual display unit is configured to permit the dispensing container to roll across the surface of the visual display unit, wherein the distance the dispensing container rolls across the surface of the visual display unit is measured to determine the level of contents of the dispensing container.

22. The system for approximating the contents of a dispensing container according to claim 1, wherein the dispensing container comprises a vessel having a valve crimped on at a neck in the vessel, wherein, the vessel is circularly cylindrical and formed with a groove within its circular cylindrical envelope, extending parallel with the length of the vessel giving it an inflected cylindrical sidewall.

* * * * *